UNITED STATES PATENT OFFICE.

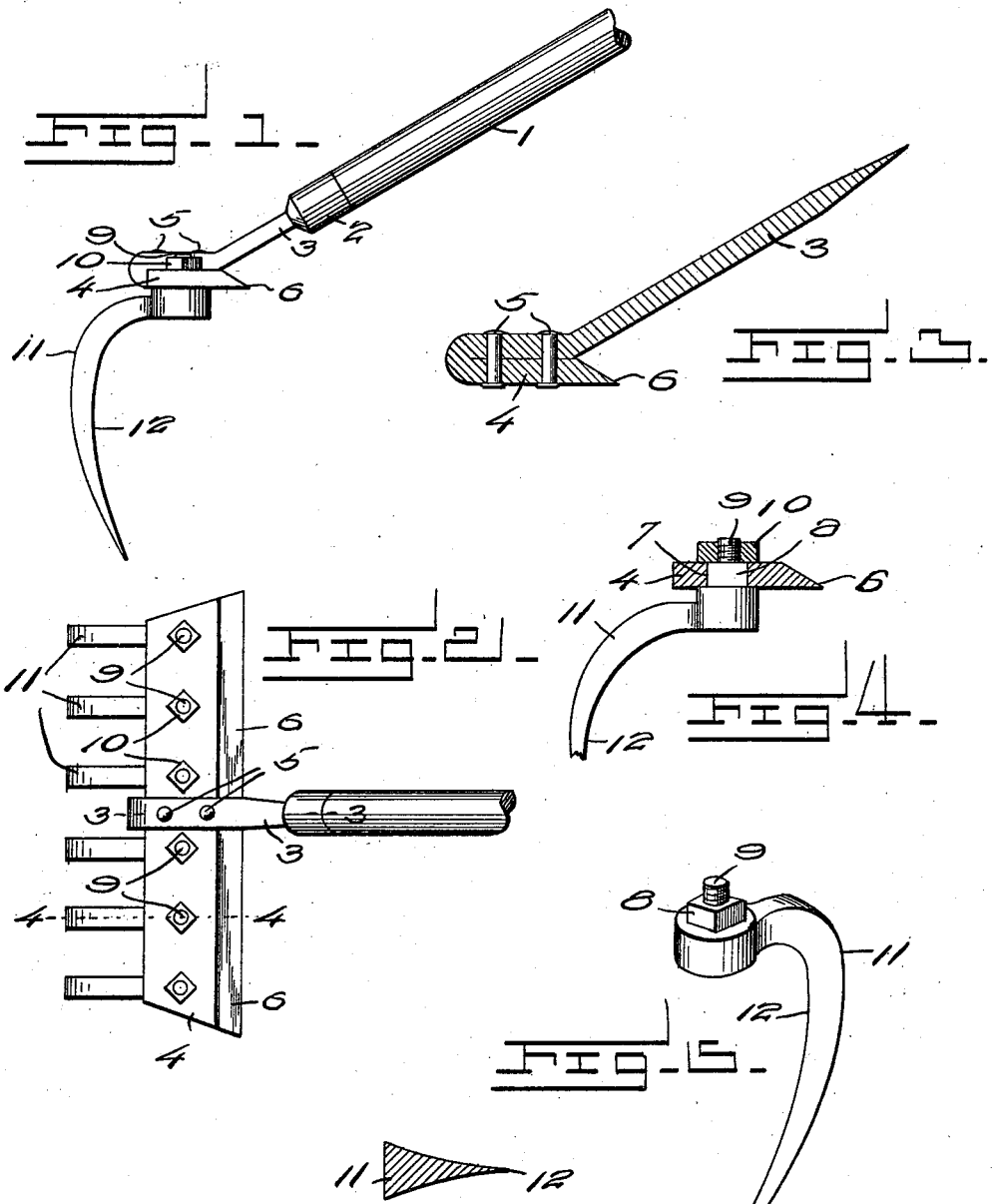

GILBERT MCOY RUSHING, OF HALLSBORO, NORTH CAROLINA.

RAKE.

1,012,712.  Specification of Letters Patent.  Patented Dec. 26, 1911.

Application filed June 20, 1911. Serial No. 634,322.

*To all whom it may concern:*

Be it known that I, GILBERT M. RUSHING, a citizen of the United States, residing at Hallsboro, in the county of Columbus and State of North Carolina, have invented certain new and useful Improvements in Rakes, of which the following is a specification.

My invention relates to improvements in rakes, and has for its leading object the provision of an improved form of rake provided with removable teeth to permit of the ready replacement of broken or badly bent teeth.

A further object of my invention is the provision of an improved rake particularly adapted for use in raking up pine straw or under conditions where raking is to be done among worthless vines.

Another object of my invention is the provision of an improved rake provided with sharpened cutting and raking teeth and a sharp edged head plate, whereby as said rake is drawn through vines it will serve to sever the same and prevent catching of the rake.

Other objects and advantages of my improved rake will be readily apparent from the following description taken in connection with the accompanying drawings, and it will be understood that I may make any modifications in the specific structure shown and described within the scope of my claims without departing from or exceeding the spirit of the invention.

Figure 1 represents a side elevation of my improved rake. Fig. 2 represents a top plan view thereof. Fig. 3 represents a sectional view of the head plate and attaching bar on the line 3—3 of Fig. 2. Fig. 4 represents a sectional view of the rake on the line 4—4 of Fig. 2. Fig. 5 represents a perspective view of one of the rake teeth, and Fig. 6 represents a sectional view thereof.

In the drawings, the numeral 1 designates the handle of my rake, said handle having on its lower end the ferrule 2 and having fitting thereinto the prong 3 of the head plate 4. Said prong is formed integral with the head plate 4 at one side thereof and is reversely bent to lie on the head plate and is secured thereto by the rivets 5 to brace the said plate. The head plate is formed at the edge adjacent or toward the handle with the sharpened or beveled portion 5 providing a cutting edge to cut upstanding vines or weeds as the rake is pulled thereagainst. Said head plate is also formed with the squared apertures 7 in which fit the square shoulders 8 of the rake teeth, threaded tangs 9 project upward above the plate and having the nuts 10 engaged thereon and bearing against the plate to secure the teeth in position. The said rake teeth have their raking portions 11 of curved form and provided with the sharpened concave edge 12, the rake teeth thus presenting substantially the appearance of hand sickles and serving to cut vines lying along the ground as the rake moves over the ground to clear the same.

From the foregoing description taken in connection with the drawings, the construction of my improved rake will be readily understood, and it will be seen that as the rake is moved along the teeth 12 will serve to grasp loose leaves, straw, or other material, while when the rake is drawn into contact with upstanding stalks or stems, the edge 6 will serve to sever said stems while the teeth 12 moving over the ground will serve to cut any vines which would otherwise become tangled up in the rake and impede the operation thereof. It will also be observed that if desired, I may employ ordinary straight teeth in place of the curved teeth 11 and similarly secure the straight teeth in the head plate 4.

I claim:

1. A rake, comprising a handle, a head plate having a tang engaged by said handle, said plate having a sharpened inner edge, and having a plurality of squared apertures formed therein, sickle shaped rake teeth having squared shoulders fitting in the apertures of the head plate and having upwardly projecting threaded tangs, nuts engaged on said tangs for locking the teeth in position, said teeth having sharpened concaved edges to cut stationary vines or stalks when drawn thereagainst.

2. The combination with a handle, of a prong fitting therein, a plate formed integral with the outer end of the prong, said plate being reversely bent and secured to the prong, and removable curved teeth secured to said plate, the edges of the plate and teeth disposed toward the handle being sharpened.

In testimony whereof I affix my signature, in the presence of two witnesses.

GILBERT MCOY RUSHING.

Witnesses.
J. B. CULBERT,
LLOYD CHAUNCEY.